United States Patent [19]

Várga et al.

[11] Patent Number: 4,747,537
[45] Date of Patent: May 31, 1988

[54] ENERGY SAVING SYSTEM FOR CONTROLLING THE TEMPERATURE OF BUILDINGS USED FOR RAISING LARGE NUMBERS OF ANIMALS

[75] Inventors: Ágnes Várga, Budapest; János Gouth, Törökbálint, both of Hungary

[73] Assignee: Innofinance Általános Innovációs Pénzintézet, Budapest, Hungary

[21] Appl. No.: 820,479

[22] PCT Filed: May 17, 1985

[86] PCT No.: PCT/HU85/00030
§ 371 Date: Jan. 21, 1986
§ 102(e) Date: Jan. 21, 1986

[87] PCT Pub. No.: WO85/05436
PCT Pub. Date: Dec. 5, 1985

[30] Foreign Application Priority Data

May 18, 1984 [HU] Hungary ............... 1912/84

[51] Int. Cl.⁴ .............................................. A01K 31/20
[52] U.S. Cl. ....................... 237/14; 237/2 B; 119/31
[58] Field of Search ........... 98/115.1, 115.3, 36, 98/32; 165/58, 59, 66; 237/2 B, 14, 3; 62/324.1; 119/30, 31, 32, 33, 34

[56] References Cited

U.S. PATENT DOCUMENTS

| | | | |
|---|---|---|---|
| 3,323,437 | 6/1967 | Knab | 98/32 |
| 4,135,370 | 1/1979 | Hosoda et al. | 62/92 X |
| 4,322,953 | 4/1982 | Ramlow et al. | 237/2 B X |
| 4,567,732 | 2/1986 | Landstrom et al. | 62/309 |

FOREIGN PATENT DOCUMENTS

PCT0486 3/1980 PCT Int'l Appl. ................ 237/2 B

Primary Examiner—Henry A. Bennett
Attorney, Agent, or Firm—Schweitzer & Cornman

[57] ABSTRACT

The invention relates to an energy saving system for heating and/or cooling of plants, particularly of animal raising plants, having areas suited for the containment of a plurality of living bodies, which system is suited for reducing the spread of infection between the various areas, characterized in that (a) there is provided an air treating unit (2) connected to a heat pump (3) for condensing the water vapors (steam) generated in the areas (1) and for recovery of the so obtained amount of heat with the aid of a vapor condenser;

(b) there is provided a dust filter (18) for eliminating the mechanical contaminations in the air of the areas (1);

(c) there is provided a chemical filter (7) for reducing, or respectively eliminating the gases that are contained in the air of the areas (1); and finally (d) there is provided a biological filter (16) for the biological filtration of the air exiting from the areas (1).

6 Claims, 2 Drawing Sheets

4,747,537

ENERGY SAVING SYSTEM FOR CONTROLLING THE TEMPERATURE OF BUILDINGS USED FOR RAISING LARGE NUMBERS OF ANIMALS

BACKGROUND

This invention relates to an energy saving system for controlling the temperature of buildings, particularly of animal raising establishments, comprising compartmentalized areas for a plurality of living animals, which system is also suitable for reducing the spread of infection between the individual compartments in said establishment.

It is known that the air in buildings which serve for containing a plurality of living animals contains waste products due to exhaled carbon dioxide and increased humidity. Added to these in animal storage structures are gases and vapors from decomposition of animal waste products, e.g. fecal matter and urine. The elimination of the vapors was made before exclusively through an exchange of air (by natural or artifical ventilation). The fresh air that was introduced had to be heated in the winter or during cold weather at other times of the year. The largest part of the heating energy is spent essentially for heating the incoming fresh air, whereas the heat content of the exhausted air is lost to the atmosphere.

Systems are known in which a heat exchange is carried out between the introduced and exhausted air, whereby an about 15-30% reduction in the energy required for heating is obtained. This method is, however, thermodynamically not sufficiently effective, since the heat exchange takes place at the lower temperature level of the exhausted air and more heat is required to raise the temperature of the incoming air to an acceptable level.

A known solution is described in Hungarian Pat. No. 174,791, according to which water vapor (steam) that is created in the building is removed through condensation, not by exhaust. The heat energy content of the water vapor (steam) amounts to about 2,350-2,500 kJ/kg. According to Hungarian Pat. No. 182,321, a heat pump is employed for the condensation and the heat content of the water vapor (steam) can be utilized at an effective temperature level with the aid of that pump. This system requires only an amount of fresh air which is required for removing the contaminating gases. In the case of poultry storage this amounts to, e.g. in the case of current norms for air exchange, a required quantity of fresh air of 2.5-4 cubic meter/kg live weight/hr in the winter, whereas the fresh air feed in the case of the water vapor condensation solution becomes lowered to 0.3-0.5 cubic meter/kg live weight/hr. According to experience a part of the contaminated gases condenses together with the water vapor (steam). It can be demonstrated that with such methods the required amount of primary energy can be lowered by about 60-75%, depending on the variety of animal. The water vapor condensation system is used in the summer to make the inside temperature tolerable by cooling, so that the production results can be maintained at optimum levels.

Further energy savings can be achieved when a suitable solution is found for the elimination of the decomposition gases or for reducing the proportion of such gases in the air of the area in question. Such method is described in Hungarian patent application No. 1228/84, according to which a substantial part of the contaminated exhaust gases is removed by chemical filtration.

The water vapors obtained in that manner, contain a negligibly low amount of exhaust gas content, but have a heat content, can be recirculated into the area as pure air at a temperature of about 20-26 degrees Centigrade.

The amount of fresh air needed can be considerably reduced, but not entirely eliminated, by means of the aforementioned solutions. The ideal condition would be when only the oxygen requirement would have to be introduced from the outside. Even the reduced amount of air that is introduced into the area contains more oxygen than is necessary for the breathing of the animals.

Recently, in the case of raising and housing, economic considerations raise problems in addition to that of achieving energy savings. One such problem is that, due to the danger of infection, different age groups cannot be kept in the same growing plant so that the utilization of the plants becomes uneconomical.

The present invention aims at providing a solution to the aforementioned problems and to create a production system which, in addition to energy savings, realizes a better utilization of the plant space and a more economical organization of operations in which the raising of different age groups can be achieved in a single poultry raising plant, without any danger.

SUMMARY OF INVENTION

This invention is based on the recognition that the lowering of the energy requirement, which is caused by water vapor condensation, and furthermore, the reduction of the fresh air requirement that is brought about by the filtration of decomposition gases enables carrying out the biological filtration of a considerably lower amount of used air that is emitted into the atmosphere. Thus, the infectants that endanger the various age groups of animals cannot pass from one area or stall to the next, with the result that various age groups can be raised next to each other.

The essential feature of the invention is that it has:

(a) an air treating unit suitably connected to a heat pump for the condensation of the vapors formed in the area and for recovery of the thus obtained heat content, (b) a dust separating filter for mechanically removing impurities from the air of the stall area, (c) a chemical filter suitable for reducing or eliminating the gases in the air of the area and, (d) a biological filter suitable for biological filtration of the air removed from the area.

BRIEF DESCRIPTION OF DRAWINGS

The invention is described in greater detail by the aid of the examples shown in the drawings, wherein.

DETAILED DESCRIPTION

Figure 1:
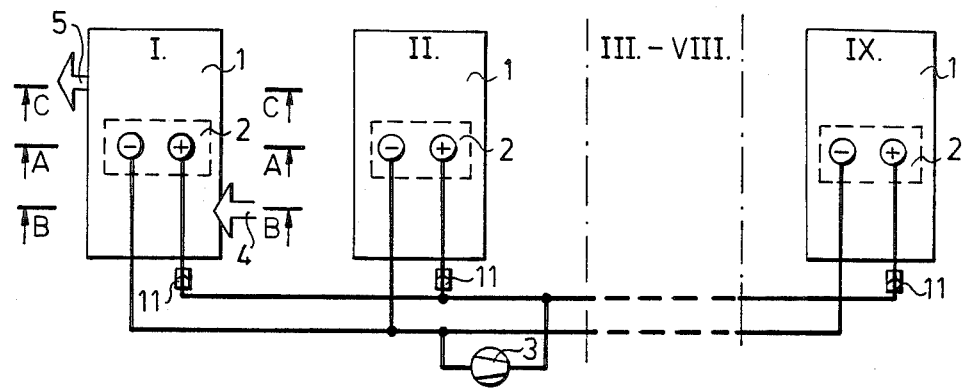
FIG. 1 shows an example of an energy saving plant system comprising nine areas, for the raising of chickens.

In the animal raising plant shown in FIG. 1, nine areas or stalls (compartments) 1 are arranged with their respective longitudinal axes parallel to each other. The sizes of the areas 1 as well as the distances between each of them correspond to customary dimensions. Air treatment units 2 are arranged in the areas 1, which are connected to a common heat pump 3 of the air treatment units. The heat pump 3 is disposed advantageously outside of the areas 1. In each area 1 is advantageously at least one fresh air introducing unit 4 and advantageously at least one air exhaust unit 5. The air exhaust units 5 are disposed in a corner of each area 1 diagonally from the fresh air introducing units 4 in each of the remaining areas 1. According to the example shown in FIG. 1 this is solved so that the fresh air introducing units 4 are disposed always in the same corner of the area 1 and similarly also the air exhaust units 5 are always disposed in the same corner of an area 1.

In another example (not shown in FIG. 1) the fresh air introducing units 4 are disposed in the vicinity of a shorter side of an area in one line, but do not open to one direction but in pairs toward each other. In a similar manner the air exhaust units 5 are in the vicinity of the other shorter sides of the areas 1 in pairs toward each other. Due to the diagonal arrangement only the fresh air introducing units 4 or only the air exhaust units 5 are disposed in a space between two adjacent areas 1. There is no difficulty presented in arranging the fresh air introducing units 4 parallel to each other in one direction on a shorter side of the areas 1. In contrast, the air exhaust units 5 are parallel to each other at the other shorter side of the areas 1. In FIG. 1 the air treatment units 2 are represented in the center of the area only due to drafting difficulties. They could be located at any desired place inside the areas 1 where they do not interfere with the functions of the areas 1.

Figure 2:
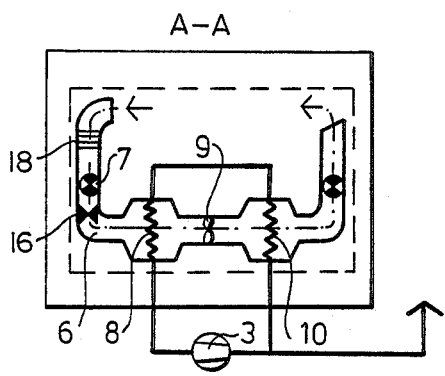
FIG. 2 is a cross section of an area taken along the line A—A, looking in the direction of the arrows, of the system according to the present invention shown in FIG. 1.

In FIG. 2 which is a section taken along the line A—A of FIG. 1 and viewed in the direction of the arrows, the air treatment units 2 are shown in greater detail. The air treatment units 2 have an air duct 6, a chemical filter 7 in the duct, a vapor condenser 8, a fan 9, and an after heater unit 10. The vapor condensers 8 of the individual air treatment units 2 are parallel to each other at the cooling side of the heat pump 3. The post (after) heater units 10 of the air treatment units 2 are parallel to each other on the heating side of the heat pump 3. Each individual post heating unit 10 is connected to the heat pump 3 over a heating regulator 11 as shown in FIG. 1, so that the amount of heat generated by the heat pump 3 can be distributed between the areas according to need.

Figure 3:
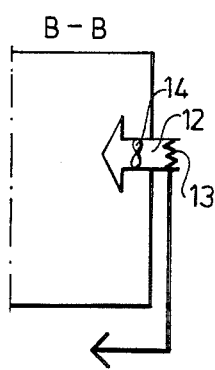
FIG. 3 is a cross section of an area taken along the line B—B, looking in the direction of the arrows, of the system according to the present invention shown in FIG. 1.

FIG. 3 shows details of the fresh air inlet units 4 through the sketch of section B—B of FIG. 1 viewed in the direction of the arrows. The fresh air inlet units 4 have another air duct 12, a preheater 13 disposed within that another air duct 12, and another fan 14. The preheater units 13 are connected at the heating side of the air pump 3.

Figure 4:
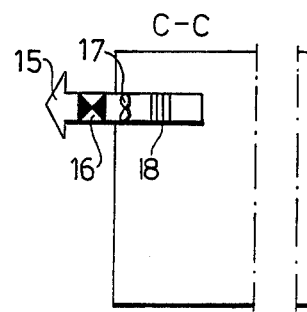
FIG. 4 is a cross section of an area taken along the line C—C, looking in the direction of the arrows, of the system according to the present invention shown in FIG. 1.

FIG. 4 shows in sketch-like form, section C—C in FIG. 1, viewed in the direction of the arrows. The air exhaust units 5 contain a third air duct 15, further, in the third air duct there is a biological filter 16 and a third fan 17. The biological filter conveniently contains a paper or textile element that is impregnated or saturated in a known manner with a liquid biocide. A dust separating filter can be suitably arranged before the biological filter 16. Suitably the dust separating filter contains a paper or textile material that is saturated or coated with humates, and one is suitably also placed in the air duct 6 of the air treatment unit 2 before the chemical filter 7.

Figure 5:
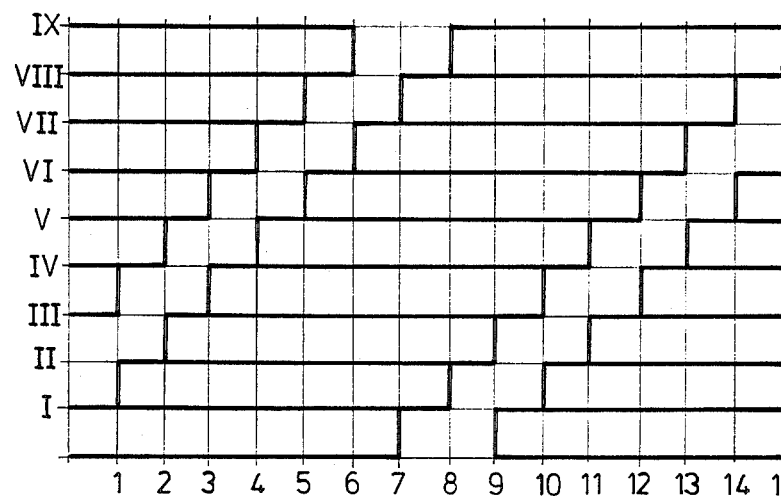
FIG. 5 is a time diagram of chicken raising in a chicken raising plant having nine areas.
Figure 6:
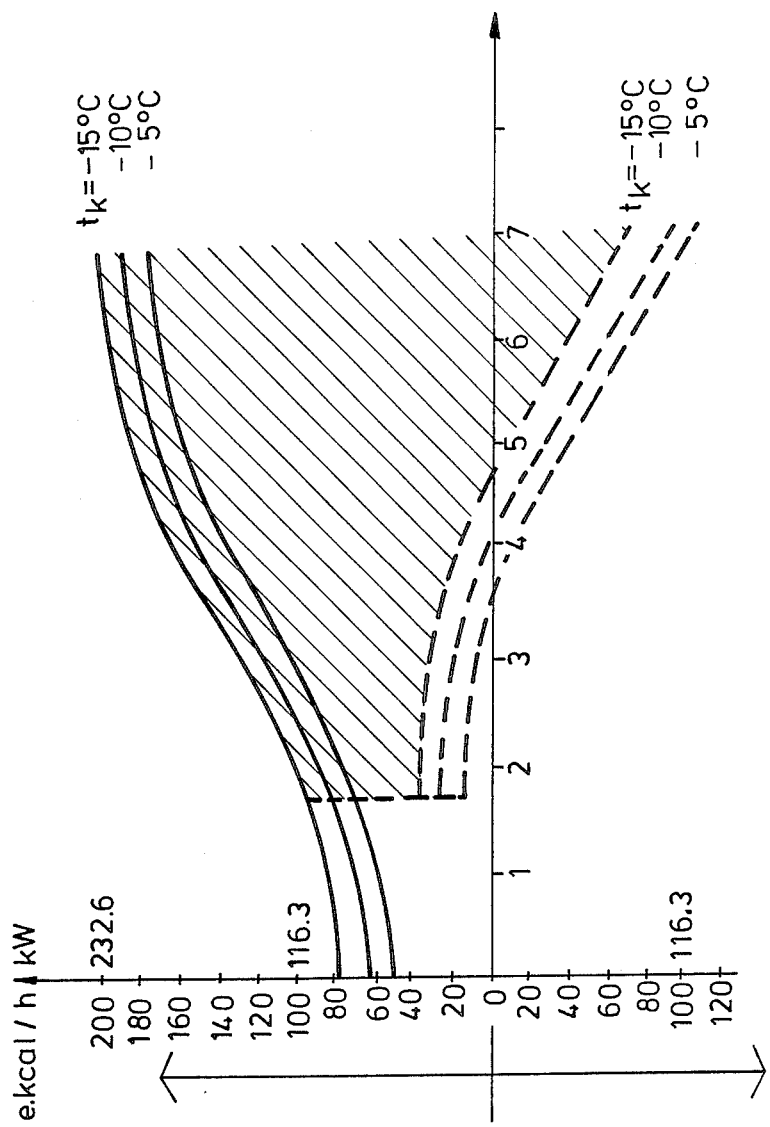
FIG. 6 shows the heating requirement in plants of the prior art and an energy saving system according to the present invention in the case of varying outside temperature.

The system according to the present invention functions as follows: The air treatment unit 2 can be constructed according to the disclosure of Hungarian Pat. No. 174,791 or Hungarian Pat. No. 182,321, and requires considerably less than usually necessary energy as well as considerably less fresh air. Further savings in the air requirement can be achieved by inserting the chemical filter 7 in the air treatment unit 2 before the heat pump 3, so that in that manner a further portion of the ammonia (which has not yet condensed with the water vapor) will be separated here, and also at the same time a part of the carbon dioxide that was created in the area will also be filtered out. The filtering of the gases enables another recirculation of the air. The reduction of the fresh air requirement permits a fresh air introducing unit 4 and an air exhaust unit 5 to be placed at both ends of the area 1 without resulting in a prohibited increase of the air flow velocity in the area 1. The concentrated air exhaust enables an economical use of the biological filtration whereby various animal age groups can be raised in a single raising plant without the danger of infection. In FIG. 5, a diagram shows the placing into areas 1 day old chicks with a time interval of a week; the area 1 is emptied after seven weeks and during the next two weeks the area is cleaned and disinfected to prepare it for the reception of the next batch of day old chicks. This kind of system enables a more even loading of workers and an evening out of the animal raising conditions. Also, in the case of energy requirements, no peaks take place, such as those occuring when animals of the same age group are raised in the plant. As shown in the diagram of FIG. 6, there is a considerably amount of heat required during the first two weeks for the raising of day old chicks and this can be obtained only by means of heating if animals of the same age group are in all stalls 1. However, depending on the outside temperature, the animals in a stall 1 in the fourth-fifth weeks begin to produce surplus heat. This heat can be utilized according to the present invention in those areas where the first-second weeks old chicks are being raised.

According to data in the literature it can be determined to what extent microclimatic factors (relative humidity, temperature, air velocity, ammonia, carbon dioxide and other waste gas concentrations as well as dust contamination) influence economical production that can be characterized by death rate, weight gain, efficiency of food utilization and egg production. It can be determined that in the system of the present invention, in the areas 1, which ones of the microclimatic factors are the most important: relative air humidity, temperature, air flow velocity and ammonia concentration can all be optimized and an improvement of production characterizing figures can be achieved compared to the prior animal raising systems.

The invention is not limited to the solutions shown in the examples, but is defined by the scope of the claims which follow.

What is claimed is:

1. An energy saving system for (1) controlling the temperature in buildings used for animal raising which have a plurality of compartmentalized areas for the containment of a plurality of living animals, and (2) reducing the spread of infection between the compartmentalized areas, wherein there is in each of said compartmentalized areas
   (a) a fresh air introducing unit comprising an air duct having disposed therein a heater and a fan;
   (b) at least one air exhaust unit comprising an air duct having disposed therein a biological filter to remove infective organisms, a dust filter and a fan, wherein said biological filter is saturated or impregnated with a biocide liquid for exhausting the disinfected air;
   (c) at least one air treatment unit connected to a heat pump outside the compartmentalized areas for condensing water vapors generated in said compartmentalized areas, said heat pump having a heating side and a cooling side, wherein each of said air treatment units comprises
   air ducts having dispersed therein a chemical filter, a biological filter, a dust filter, a vapor condenser, a fan and an after heater unit, wherein said vapor condensers recover heat obtained from said condensation and are disposed in the ducts of each of said air treatment units in parallel conection to each other through the cooling side of said heat pump in a heat exchanging relationship with said heat pump and the said after heater units are connected parallel to each other through the heating side of said heat pump.

2. Energy saving system according to claim 1 wherein a chemical filter is disposed in each of said air ducts of each of said air treatment units between each of said vapor condensers.

3. Energy saving system according to claim 1, wherein each of said dust filters is disposed in each of said air ducts of each of said air treatment units, in the direction of air flow, prior to a chemical filter.

4. Energy saving system according to claim 1 wherein each of said dust filters is disposed in each of said air ducts of each of said air exhaust units, in the direction of air flow, prior to a biological filter.

5. Energy saving system according to claim 1 wherein each of said after heating units are parallel connected over heat regulators to each of said heat pumps.

6. Energy saving system according to claim 1 wherein said chemical filter is disposed in said air ducts of the air treatment units of each compartmentalized area, in the direction of the air flow, prior to said vapor condenser.

* * * * *